United States Patent
Garcia Morchon et al.

(10) Patent No.: US 8,707,435 B2
(45) Date of Patent: Apr. 22, 2014

(54) METHOD AND SYSTEM FOR IDENTIFYING COMPROMISED NODES

(75) Inventors: Oscar Garcia Morchon, Eindhoven (NL); Klaus Kursawe, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/375,567

(22) PCT Filed: May 28, 2010

(86) PCT No.: PCT/IB2010/052382
§ 371 (c)(1),
(2), (4) Date: Dec. 1, 2011

(87) PCT Pub. No.: WO2010/140093
PCT Pub. Date: Dec. 9, 2010

(65) Prior Publication Data
US 2012/0084863 A1  Apr. 5, 2012

(30) Foreign Application Priority Data
Jun. 2, 2009 (EP) .................................. 09305505

(51) Int. Cl.
*H04L 29/00* (2006.01)
(52) U.S. Cl.
USPC ............. 726/23; 713/189; 713/190; 713/191; 713/192; 713/193; 713/194
(58) Field of Classification Search
USPC .......................................................... 726/23
See application file for complete search history.

(56) References Cited

U.S. PATENT DOCUMENTS

2008/0209560 A1* 8/2008 Dapp .............................. 726/23
2010/0034386 A1* 2/2010 Choong et al. ................ 380/270

FOREIGN PATENT DOCUMENTS

EP  2235875 A2 *  1/2009

OTHER PUBLICATIONS

Zhang et al, a framework for identifying compromised nodes in wireless sensor networks, 1-37.*
Adrian Perring, "Detecting Malicious Activity in Wireless Sensor Networks", The Croucher Foundation Advanced Study Institute on Wireless Sensor Networks, Dec. 7, 2006, XP002599370, City University of Hong Kong.
ZigBee Alliance: "ZigBee Specification", Chapter 3 Security Services Specification, Jun. 27, 2005, pp. 253-314.

* cited by examiner

*Primary Examiner* — Ghazal Shehni
(74) *Attorney, Agent, or Firm* — Larry Liberchuk

(57) ABSTRACT

The invention relates to a method for identifying compromised nodes in a ZigBee network comprising a general trust center, divided in at least two security domains, each security domain corresponding to a spatial or temporal area, and being associated with a different root keying material, and each node being identified by an identifier, the method comprising: upon detection of a node (U1) entering into a security domain (SD), the general trust center (TC) distributing to the node at least one keying material share corresponding to the entered security domain, and upon detecting corruption of at least two security domains, determining, for each security domain, based on information registered by the base station (BTS), a respective set of nodes having received keying material corresponding to said security domain,—comparing the respective sets of nodes and identifying the common nodes as being compromised.

8 Claims, 1 Drawing Sheet

METHOD AND SYSTEM FOR IDENTIFYING COMPROMISED NODES

FIELD OF THE INVENTION

The present invention relates to a method and a system for identifying compromised nodes in secure wireless network such as a ZigBee secure network.

This invention is, for example, relevant for networks carrying out telecom applications.

BACKGROUND OF THE INVENTION

Different security schemes, called polynomial or alpha-secure schemes, have been standardized in IEEE 802.15.4, ZigBee. Such schemes, which allow for efficient key agreement and information verification in ZigBee wireless networks, are based on bivariate polynomial of degree α, distributed to different nodes of the network, and used for generating pairwise keys for authenticating nodes, and securing information exchanges.

Generation of a pairwise key is performed as follows: Let $f(x,y)$ be a symmetric bivariate polynomial of degree α over a finite field $GF(q)$, where q is big enough to accommodate a cryptographic key. $f(x,y)$ is secret information. Assume that a general trust center (Tc) distributes a polynomial share derived from the bivariate polynomial to each node in a system. For instance, Alice and Bob receive $f(Alice,y)$ and $f(Bob,y)$ respectively. Whenever Alice wants to generate a key $\lfloor \log(q) \rfloor$ bit long with other party, she uses polynomial share to generate a key with it by evaluating $f(Alice,y)$ in y=Bob. The function $f(Alice,y)$ allows, therefore, Alice to generate a pairwise key with any other party in the network.

These conventional α-secure schemes were initially designed for medical networks, which comprise up to a few thousand of nodes. However, ZigBee standard is now being considered as a good technological option for many telecom applications. Telecom applications, such as information delivery, are characterized in that they may apply to million of nodes. Such a characteristic leads to major issued in α-secure systems, whose security may be compromised as soon as α nodes are compromised. In a relatively small and managed medical network, it is quite easy to detect the capture of α nodes, but such detection is not easily applicable to telecom systems, where a node is, for example; a common device such as a phone, due to the network scalability and unattended system deployment. Indeed, an attacker can actually buy α mobile phones, and then break the systems. Thus, there is a need for dealing with such attacks.

SUMMARY OF THE INVENTION

It is an object of the invention to propose a method for detecting compromising of a secure system, and identifying compromised nodes.

More precisely, it is an object of the invention to propose such a method in a network divided into several security domains, defined as spatial and/or temporal areas.

It is another object of the invention to propose a method for identifying compromised nodes in a dynamic network, i.e. a network wherein the nodes included in each security domains vary in time.

It is also an object of the invention to propose a method for allowing the application of α-secure systems to telecom applications including a large number of users.

Another aspect of the invention relates to a system for identifying compromised nodes.

The invention thus relates to a method for identifying compromised nodes in a network such as a ZigBee network comprising a general trust center, the network being divided in at least two security domains S1 and S2, each security domain corresponding to a spatial area, and being associated with a root keying material, and each node being identified by an identifier.

The method comprises the following steps:
upon detection of a node entering into a security domain, the general trust center distributing to the node at least one keying material share corresponding to the entered security domain, and
upon detecting corruption of at least two security domains,
determining, for each security domain, based on location information registered by the base station, a respective set of nodes having received keying material corresponding to said security domain,
comparing the respective sets of nodes and identifying the common nodes as being compromised.

In a particular embodiment, the network is a telecommunication network, and
the detection of a node entering into a security domain is performed by a base station of the network, based on location information of a mobile phone carried by the user,
the distributing step comprises: the general trust center generating at least one keying material share, based on the root keying material corresponding to the security domain, and on an identifier of the node.

The general trust center is a secured device controlled or operated by, for example, a mobile phone operator. The keying material provided to the nodes are used for securing communications between some mobile nodes of the network, for instance mobile phones carried by users, and some nodes representing telecom service providers. In an exemplary embodiment, a telecom service provider is an information access point set up in a public place, which allows a user to get information such as commercial advertisement.

Transmissions between the base station and the nodes of the networks are performed by using a telecom protocol, such as GSM or UMTS.

Transmissions between the mobile nodes and the telecom service providers are performed via ZigBee.

In another embodiment, which can be combined with the preceding ones, the method comprises the following steps:
the general trust center determining the time where a security domain is considered as corrupted, and
the determination of the respective set of nodes comprises determining the nodes belonging to the security domain at the corruption time.

Moreover, in order to decrease the amount of comparison to be performed for determining the compromised nodes, a method according to the invention comprises, in some cases, wherein the network is divided into N security domains, N>2, and wherein B security domains are determined as being broken at different times $t_1$ to $t_B$,
determining a search window of width W, where W≤B, and
the determination step comprises determining, based on location information, only the respective set of nodes for the security domains corrupted between time $t_1$ and time $t_w$.

In another embodiment of the invention, which can be combined with the preceding ones, a security domain refers not only to a spatial area, but also to a temporal area. For instance, all the users who are in the surroundings of a commercial mall on the same day belong to the same security domain. This means that they were assigned polynomial shares generated from the same root keying material. The administrator of the system controls the system design specifying the generated security domains In such embodiment, the method further comprises the step of, at a given time, distributing a new set of keying material to all nodes belonging to a security domain at the given time, in order to renew the security domains. Moreover, in the same embodiment, an identifier of a node comprises a fixed part and a variable part, comprising the step of, when distributing new keying material to the system, modifying the variable part of the identifier. This variable component in the identifier allows distributing a sub-set of polynomial shares generated from a different sub-set of bivariate polynomials when a combinatorial or randomized distribution, e.g. based on finite projective planes is used for the polynomial keying-material structure. This approach allows the general trust center to further reduce the number of possible compromised nodes.

Another aspect of the invention relates to a system for identifying compromised nodes in a network, divided in at least two security domains S1 and S2, each security domain corresponding to a spatial area, and being associated with a root keying material, and each node being identified by an identifier, the system comprising:

a general trust center, with means for generating, based on a root keying material and an identifier of a node, keying material shares to be transmitted to a node, a base station comprising
　means for detecting entry of a node into a security domain,
　means for registering location information of a user, and
　means for transmitting keying material from the general trust center to the nodes wherein the general trust center further comprises means for determining, for each security domain, based on location information registered by the base station, a respective set of nodes having received keying material corresponding to said security domain, and means for comparing respective sets of nodes.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
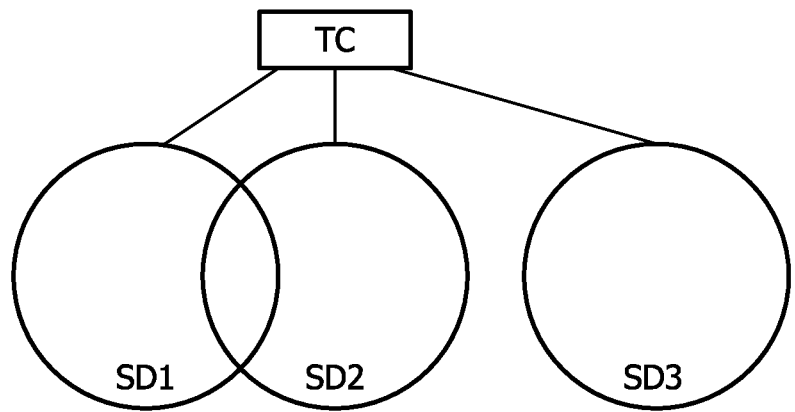
FIG. 1 shows a general system according to the invention.

The present invention relates to a method for identifying compromised nodes in a network as shown on FIG. 1. This specific example is described in the case where the network is a ZigBee network carrying out telecom applications, but it can be applied to any type of communication network using ZigBee. The present invention can also be applied to other networks using related security mechanism based on polynomials or a multitude of space-temporal security domains.

Figure 2:
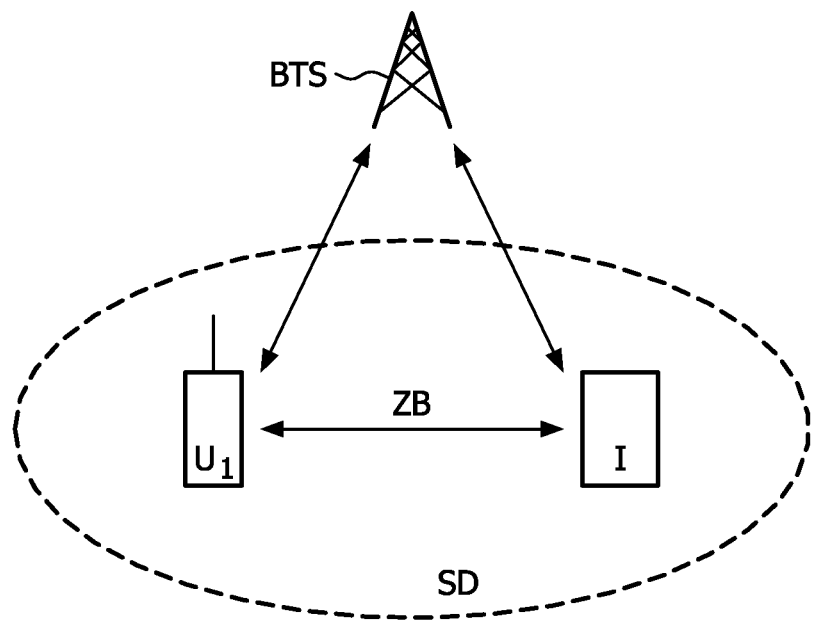
FIG. 2 shows only one security domain of a system as shown on FIG. 1.

This network comprises a general trust center (TC), which is operated by a Mobile Phone Operator (MPO). This general trust center is used for creating several security domains ($SD_1$, $SD_2$, $SD_3$) over the network. In this specific example, a security domain SD, as shown on FIG. 2, corresponds to a public place, for example comprising a ZigBee information access points I Indeed, these security domains correspond to physical sector, situated around each information access point.

The telecom application described in the present example is a service that allows a user to get, from one access point, information related to the public place, when the user is situated in the physical sectors corresponding to these information access points. The user accesses the information via a mobile gateway; for example a mobile phone.

Each ZigBee information access point includes at least a set of polynomial keying material, generated by the general trust center, from at least a root keying material corresponding to the access point, and distributed to the access point during low-load phases, for example during night when no user is present in the public place.

The service then works as follows:
In a first phase, a user $U_1$ registers to the service, via the mobile phone operator.
Then, as soon as the user enters in one of the sectors corresponding to a security domain, his presence is detected by a base station (BTS) situated close to the mall. The user brings a mobile gateway, such as a mobile phone, comprising means for communicating with a base station, and a ZigBee interface.
Then, the users receive a message asking for confirmation that he wants to use the service he has registered for.
In case the user actually sends a confirmation message, then he receives keying material from the general trust center, via the base station (BTS).
Transmission of the keying material is performed as follows:
The mobile phone operator detects the security domain the user has entered in,
The mobile phone operator then generates, based on an identifier of the mobile phone of the user, and based on the root keying material corresponding to the security domain, a set of keying material.
The set of keying material is transmitted, via GSM or any other telecommunication protocol, to the mobile phone of the user.
By using this keying material, the user then has the possibility to join the security domain defined in the public place, and to exchange information with the information access point, via ZigBee, in a secure way. Without such a keying material, the user cannot identify himself and cannot access to the services.

Actually, the polynomial keying material specified in the a-secure key establishment cluster is distributed according to a combinatorial/random distribution. A possible combinatorial distribution is one that ensures the distribution of several (n+1) polynomial shares derived from a pool of bivariate polynomials ($n^2+n+1$). The n+1 bivariate polynomials, which are chosen to generate the n+1 polynomial shares of a node, depend up to the node identifier ID.

Dividing the system into security domains the system makes it possible to keep a track of the devices that received keying material for a security domain that is broken. For instance, let imagine that the whole system accommodates N million of devices and that each security domain accommodates M users. Let us assume that the system keeps track of the users that are in a security domain at any moment. For instance, user $U_1$ has first belonged to security domain $SD_1$, and then to security domain $SD_2$, since, for example, the user has moved from one public place to another.

If the system detects that at time t1, t2, t3, and t4 four different security domain have been broken and each security domain accommodates a set of users S1, S2, S3, S4, then the system can determine the compromised nodes by looking for the nodes that appear in the four sets S1, S2, S3, and S4.

In this example; four security domains are broken, and the system performs the check over all the domains. However, in another example, the system applies a similar approach to a limited number of sets. In this view, the system creates a search window of width W that takes into account only the identifiers and/or keying material of the users belonging to the last broken W security domains.

To further improve the system, in one embodiment, each device of the system, namely each mobile phone, is assigned a variable identifier. For example, each device is identified via an identifier comprising two parts:
A fixed part of b' bit length, for example 24, and
A variable part of b' bit length; for example 8.

The fixed part remains constant for the whole lifetime of the device, and the variable part is, for example, updated each time a new set of keying material is distributed.

Therefore, a device gets for each changing identifier a set of n+1 polynomial shares derived from n+1 different bivariate polynomials, with a different identifier. Now, assuming that an attacker has captured or purchased X devices, she is going to be able to break a different sub-set of the n^2+n+1 bivariate polynomials every time the identifiers of her compromised nodes are updated. Consequently, she will be able to break only those communication links. If the system monitors this behaviour for a number of iterations, the system can find out which nodes are broken (i.e., are controlled by the attacker) and which nodes are not.

In the above-described examples, each node receives n+1 polynomial shares generated from a pool containing n^2+n+1 nodes, but this can be generalized to any number of polynomials.

The present invention is more especially dedicated to network aimed at carrying out telecom applications, but it can be applied to any other wireless networks where security is required, such as medical sensor networks.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A method for identifying compromised nodes in a ZigBee network comprising a general trust center, divided into a plurality of security domains, each security domain being associated with a different root keying material, and each node being identified by an identifier, the method comprising:
   upon detecting a node entering a security domain, the general trust center distributing to the node at least one keying material share corresponding to the entered security domain, and
   upon detecting corruption of at least two of the plurality of security domains,
   determining, for each corrupted security domain, based on information registered by a base station, a respective set of nodes having received the at least one keying material share corresponding to the corrupted security domain,
   comparing the respective set of nodes corresponding to the at least two corrupted security domains and identifying common nodes as being compromised.

2. The method as recited in claim 1, wherein the ZigBee network is a telecommunication network, and wherein:
   the node entering into the security domain is detected by the base station of the network based on information of a mobile phone carried by a user,
   the general trust center generates the at least one keying material share based on the different root keying material corresponding to the security domain.

3. The method as recited in claim 1, further comprising:
   determining a time where the security domain is considered corrupted, and
   determining the respective set of nodes belonging to the corrupted security domain at the time of corruption.

4. The method as recited in claim 1, wherein the ZigBee network is divided into N security domains, N≥2, and wherein B security domains are determined as being broken at different times $t_1$ to $t_B$, the method further comprising:
   determining a search window of width W, where W≤B, and determining, based on the information, only the respective set of nodes for W security domains corrupted between time $t_1$ and time $t_w$.

5. The method as recited in claim 4, wherein the identifier of the node comprises a fixed part and a variable part, and when distributing new keying material to the node, modifying the variable part of the identifier of the node.

6. The method as recited in claim 5, wherein the variable part of the identifier further limits a number of possible compromised nodes.

7. The method as recited in claim 1, further comprising distributing a new set of keying material to all nodes belonging to the security domain at a given time.

8. A system for identifying compromised nodes in a network, divided into a plurality of security domains, each security domain being associated with a different root keying material, and each node being identified by an identifier, the system comprising:
   a general trust center; and
   a base station,
   wherein the base station is configured to:
      detect entry of a node into a security domain,
      register location information of a user, and
      transmit keying material share from the general trust center to the node,
   wherein the general trust center is configured to:
   generate, based on the different root keying material corresponding to the security domain and the identifier of the node, the keying material shares to be transmitted to the node,
   detect corruption of at least two of the plurality of security domains,
   determine, for each corrupted security domain, based on location information registered by the base station, a respective set of nodes having received the keying material shares corresponding to the corrupted security domain, and
   compare the respective set of nodes corresponding to the at least two corrupted security domains and identify common nodes as being compromised.

* * * * *